July 13, 1965 — E. L. HOPKINS ETAL — 3,194,056
PERMEABILITY TESTING METHOD AND APPARATUS
Filed Jan. 26, 1962
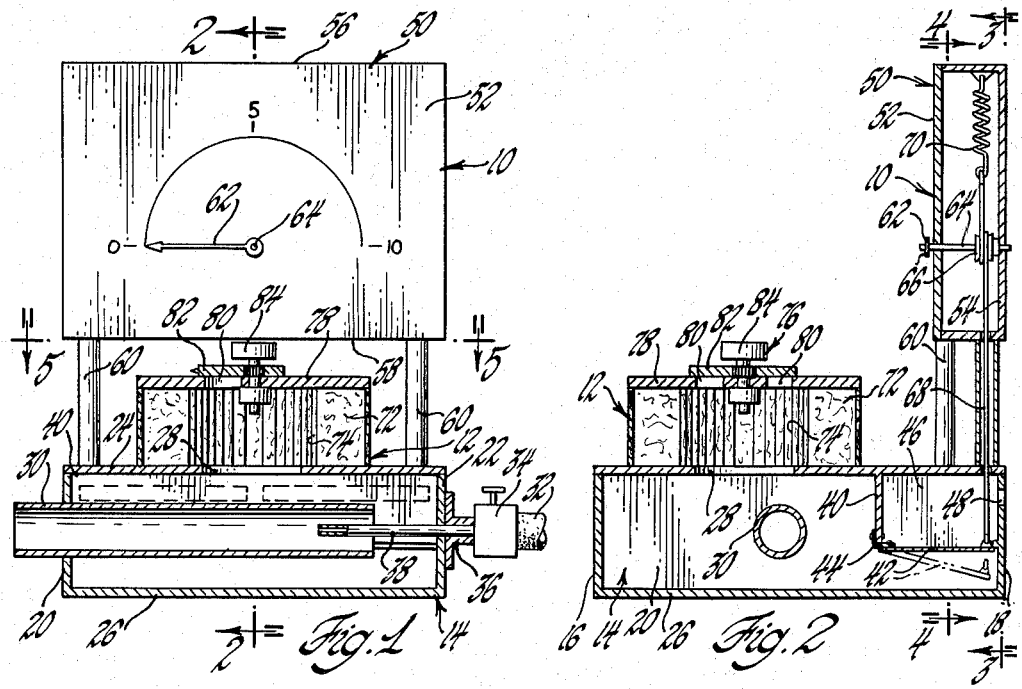
INVENTORS
Evan L. Hopkins &
BY Lee K. Irwin
Winnie, Barnard & McGlynn
ATTORNEYS 3,194,056
PERMEABILITY TESTING METHOD AND
APPARATUS
Evan L. Hopkins and Lee K. Irwin, Emporia, Kans.,
assignors to Hopkins Manufacturing Corporation,
Incorporated, Emporia, Kans., a corporation of
Kansas
Filed Jan. 26, 1962, Ser. No. 168,924
16 Claims. (Cl. 73—38)

This invention pertains to a method and apparatus for testing the fluid permeability or porosity of a material or member and, more particularly, is directed to a method and apparatus for determining the air permeability or extent of clogging of an air filter element of the type typically employed in conjunction with internal combustion engines.

The method and apparatus alluded to above may be utilized to advantage in many environments, such as determining the air or liquid permeability or porosity of sheet materials of various types, bundles of fibrous materials and the like, as will become readily apparent as the description of the invention proceeds. However, since the invention was conceived and developed in connection with the art of testing the air permeability or porosity of air filter elements of the type commonly employed with internal combustion engines, the latter art will be referred to hereinafter in order to facilitate an understanding of the invention.

As is well known, of course, air filter elements of the type typically employed with internal combustion engines, such as are used on lawnmowers and automotive vehicles, have the intended purpose of filtering various and sundry impurities from the air being supplied to the fuel mixture for the engine. As is equally well known, as such impurities are filtered out of the air they gradually tend to build up on the filter element, thereby gradually reducing the air filtering efficiency of the latter and eventually resulting in a sufficient area thereof being clogged so as to make it advisable to replace the used filter element with a new filter element in the interest of protecting the engine itself. However, it must be noted that the extent of clogging and, hence, the efficiency of an air filter element for an internal combustion engine depends not on one but on several factors such as, for example, the period during which the filter element has been mounted on the engine, the hours of operation of the engine, ambient atmospheric conditions in which the engine is operated and certain reactions which can occur between the filter element and various impurities filtered thereby. Thus, due to any one or various combinations of these considerations as well as others, the useful life of a given type of air filter assembly may vary considerably.

Notwithstanding the foregoing considerations, for years it has been the usual practice to change the air filter element on a particular engine at certain predetermined intervals. For example, an automobile manufacturer usually recommends changing the engine air filter element after so many miles of driving the vehicle. Lawnmower manufacturers, on the other hand, usually recommend changing the air filter element on the mower after so many hours of operation. Obviously, these yardsticks result largely from a rule of thumb, and bear no close relation to the actual period of usefulness of any given engine air filter since they do not take into consideration such other factors as the type of use to which the engine is subjected, ambient air conditions and other of the factors aforementioned, and certainly do not reflect any consideration for the interplay between these factors in order to accurately determine when it is time to change the air filter. As a result, many air filters are changed even though they still have considerable remaining useful life; in other instances, air filters are left on an engine beyond their useful life resulting in damage to the engine itself.

It is, therefore, a principal object and feature of this invention to provide a relatively simple, inexpensive and accurate method and apparatus for determining the fluid permeability or porosity of a body such as sheet materials, a bundle of fibrous material, an air filter element and the like.

It is yet another object and feature of this invention to provide a method and apparatus for testing and determining the air permeability or porosity of a body of material or device, particularly an air filter element of the type employable with internal combustion engines, which is simple, inexpensive and accurate and may be readily utilized by a person having no technical skill or scientific knowledge, such as perhaps an automotive vehicle operator or filling station attendant, to conveniently and accurately determine the air permeability or porosity of such material or device.

It is yet another object and feature of this invention to provide a method and apparatus whereby a person having no technical skill or scientific knowledge relating to air filters for internal combustion engines, such as many filling station attendants, may quickly, easily, conveniently and with considerable accuracy determine whether an engine-mounted air filter element is still useable or unfit for further use, and can readily demonstrate the condition of the filter element to the vehicle operator, who is usually even less skilled concerning air filters.

It is yet another object and feature of this invention to provide a method and apparatus for determining the extent or area of clogging of an air filter element for an internal combustion engine easily, quickly, conveniently and accurately, and in a manner readily demonstrable to the operator of the vehicle.

These and other objects, features and advantages of the invention will become more apparent hereinafter as the description proceeds, and in which reference is made to the drawings in which:

FIGURE 1 is a front elevation, partially in section to illustrate certain details, of a preferred embodiment of the invention;

FIGURE 2 is a sectional view taken on line 2—2 of FIGURE 1;

FIGURE 3 is a fragmentary view taken on line 3—3 of FIGURE 2;

FIGURE 4 is an enlarged fragmentary sectional view taken on line 4—4 of FIGURE 2; and FIGURE 5 is an enlarged view, partially broken away to illustrate certain details of the invention, taken on line 5—5 of FIGURE 1.

Referring now to the drawings, the numeral 10 generally indicates an apparatus for testing an air filter assembly, indicated generally at 12, of the type commonly employed with internal combustion engines of automotive vehicles. The apparatus 10 comprises a housing 14 including the oppositely disposed front and rear walls 16 and 18, respectively, side walls 20 and 22, respectively, and upper and lower walls 24 and 26, respectively. The upper wall 24 of the housing includes an opening 28 therein communicating the interior of the housing 14 with atmospheric pressure exteriorly thereof, and is of a suitable size and shape, preferably circular in configuration, so as to cooperate with the air filter element 12 in a manner to be described hereinafter.

A tubular exhaust conduit 30 is suitably mounted in the side wall 20 so as to have one end disposed interiorly of the housing 14 while the other end discharges into atmosphere as clearly illustrated in FIGURE 1 of the drawings. A suitable source of air under pressure is adapted to supply air through a flexible hose 32 and valve member 34, which may be readily removably coupled to a fitting 36 on the side wall 22, so as to communicate with a small diameter supply pipe 38 extending inwardly of the exhaust conduit 30 and radially spaced from the inner sides thereof. Upon coupling the hose 32 to the supply pipe 38, the valve member 34 may be adjusted to control the supply of air through the pipe 38 which is then discharged at a relatively great velocity to generate a subatmospheric pressure within the housing 14 and, as a consequence of the pressure differential between atmospheric pressure exteriorly of the housing and the aforementioned subatmospheric pressure, induces a flow of air from the exterior of the housing through the opening 28 to the interior thereof and back to atmosphere through the exhaust conduit 30. If desired and as necessary, a small orifice forming member may be mounted at the discharge end of supply pipe 38 for increasing the velocity of air discharged therefrom.

A partition 40 is suitably rigidly supported within the housing 14 so as to extend along the upper wall 24 thereof between the side walls 20 and 22. A pressure differential responsive member in the form of a plate 42 is substantially coextensive with partition 40 between side walls 20 and 22, and has one edge thereof suitably pivotally connected as indicated at 44 to the depending end of the partition 40. Plate 42 extends rearwardly from partition 40 to a point adjacent the rear wall 18, where the free edge thereof underlies and is adapted to abut a stop shoulder 44. As indicated particularly in FIGURE 2, the pressure responsive plate 42 is so positioned within the housing as to form within the latter an ambient air pressure chamber 46 which is in direct communication with atmospheric pressure through a pair of laterally elongated slots 48 formed in the rear wall 18 of the housing. As will be apparent, the pressure plate 42 is pivotally movable about its hinge 44 in response to the pressure differential on opposite sides thereof.

An enclosed indicator housing 50 comprising front and rear walls 52 and 54, respectively, and upper and lower walls 56 and 58, respectively, is suitably supported above the housing 14 as by means of a pair of vertically extending support rods 60. Suitable indicia is provided on the front wall 52 of the housing 50 as indicated particularly in FIGURE 1 so as to cooperate with a pointer 62 having one end secured to a shaft or spindle 64 rotatably supported on the front and rear walls 52 and 54 of the housing 50. A spool or drum 66 is rigidly secured to the shaft 64 and a motion transmitting member, herein shown to be in the form of a flexible cord or string 68, has its lower end extending through the lower wall of the housing 50 and upper wall of the housing 14 for connection to the free movable edge of the pressure plate 42. An intermediate portion of the cord 68 is wrapped a suitable number of turns around the spool 66, and the upper end of the cord is connected through a tension spring 70 to the upper wall 56 of the housing 50. Thus, it will be seen that pivotal movement of the pressure plate 42 about the hinge 44 will cause the cord 68 to rotate the spool 66 in opposition to the force of the spring 70 to rotate the pointer 62 to a particular point on the scale of the front wall 52 of the housing, the spring 70 always tending to return the pointer to its zero or reference position and plate 42 to the full line position of FIGURE 2 in which it abuts stop shoulder 44.

The filter element 12 is of the type comprising an annular axially extending body formed of a continuous series of interconnected accordian pleats or folds 72. The filter body may be formed of a suitable air permeable material or actually provided with discrete openings therein for filtering air therethrough, and further includes an axially extending annular opening 74 centrally therethrough. As will be readily apparent, the filter element 12 is usually enclosed within a housing including annular header members located at axially opposite ends thereof and which are interconnected by an air permeable means securing the entire assembly together. However, such a filter housing is not shown in the drawings in order not to obscure the invention.

Such a filter assembly, and particularly the filter element 12 thereof, is adapted to be removably mounted in a test position on the apparatus in which one axial end thereof is engaged with the upper wall 24 of the housing 14 so as to surround and directly communicate the axial opening 74 therein with the opening 28 in the upper wall of the housing. In order to complete the mounting of the filter assembly or element in the test position aforementioned, the other end thereof is engaged by a test head assembly indicated generally at 76.

The test head assembly 76 is adapted to be removably seated on the other axial end of the filter element 12 and comprises a circular plate 78 having a semicircular aperture 80 therein overlying and directly communicating with the axial opening 74 in the filter element and, hence, the opening 28 in the housing 14. A semicircular valve plate 82 is suitably secured to an adjusting knob 84, the knob and plate being suitably pivotally supported on the plate 78, whereby movement of the valve plate 82 selectively controls the area of opening of the aperture 80 in the plate. The valve plate 82 is provided with an indicating pointer or member 86 adapted to cooperate with indicia on the periphery of the plate 78 as indicated in FIGURE 5, which indicia is calibrated as a percentage of the area of an air filter element being tested which is clogged, as will appear hereinafter.

In operation, a new or perfectly clean and unclogged air filter element 12 is mounted in the test position aforedescribed and illustrated in FIGURES 1 and 2 with the valve plate 82 completely covering the aperture 80 in the plate 78 as indicated in FIGURES 1, 2 and 5. Air under pressure is then introduced as aforedescribed into the exhaust conduit 30, resulting in a partial vacuum or subatmospheric pressure within the housing 14 causing air to flow under atmospheric pressure exteriorly of said housing through the porous folds 72 of filter element 12 and opening 28 to the interior of the housing 14. Valve 34 is adjusted to adjust the supply of air from the pipe 38 to the exhaust conduit 30 until the air flow through the filter element 12 results in a pressure differential exteriorly and interiorly of the housing or pressure drop through the filter element 12 which is sufficient to just cause the pressure differential responsive member or plate 42 to tend to move in opposition to the spring 70. As a matter or fact, when this condition is attained, there will be a slight fluttering movement of the plate 42 resulting in the indicator 62 dancing slightly to indicate that a reference pressure differential or pressure drop has been reached.

Thus, although the indicator 62 is illustrated in FIGURE 1 as indicating such a reference pressure condition by pointing at the zero on the scale, it will be readily understood that the numerical indicia on the scale may be replaced by letters or any other type of symbols. In other words, irrespective of the type of indicia employed, the operation of the method and apparatus described thus far is to attain a reference air flow and a reference pressure differential or drop through a reference filter element so as to calibrate the apparatus. For the purpose of the following description, therefore, it will be assumed that in this reference pressure condition the indicator 62 will point to the zero point on the scale shown.

Thereafter, the test head assembly 76 is removed, and the clean air filter element replaced in the test position illustrated in FIGURES 1 and 2 by a dirty filter element to be tested, and the test head assembly 76 replaced thereon with the valve plate 82 still closing the aperture 80 in the plate 78. Depending upon how dirty or how much area of the filter being tested is clogged, there will be a reduced flow of air through the filter element into the interior of the housing 14, resulting in a decrease in the pressure therein causing the pressure responsive plate 42 to swing downwardly as indicated in dotted lines in FIGURE 2 and the indicating needle 62 to register some place on the scale illustrated in FIGURE 1. In other words, the pressure in the housing 14 will drop below the pressure therein while calibrating the apparatus, thereby resulting in a new or test pressure differential or drop.

At this time, the knob 84 and valve plate 82 may be turned clockwise in FIGURE 5 so as to uncover a suitable portion or area of the aperture 80. Depending upon the extent to which the aperture 80 is open, a given volume of air will flow from atmosphere through the opening of the aperture 80, axial opening 74 in the filter element being tested and opening 28 to result in a new pressure drop or differential interior and exteriorly of the housing, which is less than the aforementioned test pressure drop or differential. The valve plate 82 is adjusted until such time as the area of the opening of the aperture 80 is sufficient to cause the pressure responsive plate 42 to move back to the full line position of FIGURE 2, and the indicator 62 to return to its reference position at zero as indicated in FIGURE 1; that is, the aperture 80 is opened until such time as the pressure differential exteriorly and interiorly of housing 14 resulting from augmenting the flow of air to the interior of housing 14 through the aperture 80 substantially equals the aforementioned reference pressure drop or differential. At this time, the area of the opening of the aperture 80 is substantially equal to the difference between the open area in the new or reference filter element and the open area in the old filter being tested. In other words, the area of the aperture 80 exposed by turning the knob 84 and moving the valve plate 82 is equal to the amount of the area stopped up or clogged in the old filter element being tested, and is read as a percentage from the scale on the plate 78 as indicated by the pointer 86 on the valve plate 82.

While but one form of the invention has been shown and described, other forms will now be apparent to those skilled in the art. Therefore, it will be understood that the embodiment shown in the drawings and aforedescribed is merely for illustrative purposes, and is not intended to limit the scope of the invention which is defined by the claims which follow.

We claim:

1. A method of testing the fluid permeability of an element comprising the steps of passing a flow of fluid from one side of a reference element through the latter to the other side thereof to establish a reference pressure drop therethrough, passing a flow of fluid from one side of a test element through the latter to the other side thereof to establish a test pressure drop therethrough, and supplying a metered flow of fluid from said one side of said test element to said other side thereof without passing therethrough until said test pressure drop substantially equals said reference pressure drop, whereby the amount of said metered flow of fluid indicates the fluid permeability of said test element relative to said reference element.

2. A method of testing the fluid permeability of an element comprising the steps of passing a flow of fluid under substantially constant pressure from one side of a reference element through the latter to the other side thereof to establish a reference pressure drop therethrough, passing a flow of fluid under said constant pressure from one side of a test element through the latter to the other side thereof to establish a test pressure drop therethrough, and supplying a metered flow of fluid under said constant pressure from said one side of said test element to said other side thereof without passing therethrough until said test pressure drop substantially equals said reference pressure drop, whereby the amount of said metered flow of fluid indicates the fluid permeability of said test element relative to said reference element.

3. A method of testing the air permeability of an element comprising the steps of subjecting one side of a reference element to atmospheric pressure and the other side thereof to a subatmospheric pressure to establish a reference flow of air and a reference pressure drop therethrough, subjecting the corresponding sides of a test element to said atmospheric pressure and a subatmospheric pressure to establish a test flow of air and a test pressure drop therethrough, and supplying a metered flow of air under said atmospheric pressure from one side of said test element to the other side thereof without passing therethrough until said test pressure drop substantially equals said reference pressure drop, whereby the amount of said metered flow of air indicates the air permeability of said test element relative to said reference element.

4. A method of testing the area of clogging of an air filter element having an opening therein communicating the opposite ends thereof; said method comprising the steps of subjecting one side of a reference air filter element to atmospheric pressure and the other side thereof to a subatmospheric pressure to establish a reference flow of air and a reference pressure drop through said reference air filter element, subjecting the corresponding sides of a test air filter element to said atmospheric pressure and a subatmospheric pressure to establish a test flow of air and a test pressure drop through said test air filter element, and supplying a metered flow of air under said atmospheric pressure on the one side of said test air filter element to the other side thereof through the opening therein until said test pressure drop substantially equals said reference pressure drop, whereby the amount of said metered flow of air indicates the area of clogging of said test air filter element relative to said reference air filter element.

5. A method of testing the area of clogging of an annular axially extending air filter element having an axial opening therein communicating the axially opposite ends thereof; said method comprising the steps of subjecting one side of a reference air filter element to atmospheric pressure and the other side thereof to a subatmospheric pressure to establish a reference flow of air and a reference pressure drop through said reference air filter element, measuring said reference pressure drop, subjecting the corresponding sides of a test air filter element to the same pressure conditions as said reference air filter element to establish a test flow of air and a test pressure drop through said test air filter element, and supplying a variable metered flow of air under said atmospheric pressure on the one side of said test air filter element to the other side thereof through the opening therein until said test pressure drop substantially equals said reference pressure drop, whereby the amount of said metered flow of air indicates the area of clogging of said test air filter element relative to said reference air filter element.

6. An apparatus for testing the fluid permeability of an element comprising means for passing a flow of fluid under a substantially constant pressure from one side of a reference element to the other side thereof, means for determining the pressure on the other side of said reference element as a result of said flow, said first-named means being operable to pass a flow of fluid under said constant pressure from one side of a test element to the other side thereof, said second-named means being operable to determine the pressure on the other side of said test element as a result of said last-named flow, means for comparing said pressures resulting from said first and second-named flows, and means for supplying a metered flow of fluid from said one side to said other side of said test element without passing therethrough until said pressure comparing means indicates that the pressure on said other side of said test element substantially equals the pressure on said other side of said reference element, whereby the amount of said metered flow of fluid indicates the fluid permeability of said test element relative to said reference element.

7. Apparatus for testing the fluid permeability of an element comprising means for passing a flow of fluid through a reference element to establish a reference pressure drop therethrough, pressure differential responsive means, means communicating said pressure differential responsive means with the pressure of said fluid on opposite sides of said reference element to indicate said reference pressure drop, said first-named means being operable to pass a flow of fluid through a test element to establish a test pressure drop therethrough, said pressure differential responsive means being operable to indicate said reference pressure drop, means for comparing said test pressure drop with said reference pressure drop, and means for supplying a metered flow of fluid between opposite sides of said test element without passing therethrough until said pressure drop comparing means indicates that said test pressure drop substantially equals said reference pressure drop, whereby the amount of said metered flow of fluid indicates the fluid permeability of said test element relative to said reference element.

8. An apparatus for testing the fluid permeability of an element comprising means for passing a flow of fluid from one side of a reference element through the latter to the other side thereof to establish a reference pressure drop therethrough, said means being operable to pass a flow of fluid from one side of a test element through the latter to the other side thereof to establish a test pressure drop therethrough, pressure differential responsive means, means for successively communicating said pressure differential responsive means with the pressures on opposite sides of said reference element and said test element to indicate said reference pressure drop and said test pressure drop, respectively, and means for supplying a metered variable flow of fluid from said one side of said test element to said other side thereof without passing therethrough until said pressure differential responsive means indicates that said test pressure drop substantially equals said reference pressure drop, whereby the amount of said metered flow of fluid indicates the fluid permeability of said test element relative to said reference element.

9. An apparatus for testing the air permeability of an element comprising means for subjecting one side of a reference element to atmospheric pressure and the other side thereof to a subatmospheric pressure to establish a reference flow of air and a reference pressure drop therethrough, pressure differential responsive means, means communicating said pressure differential responsive means with said atmospheric pressure and said subatmospheric pressure to indicate said reference pressure drop, said first-named means being operable on the corresponding sides of a test element to establish a test flow of air and a test pressure drop therethrough, said pressure differential responsive means being operable to indicate said test pressure drop and the difference between the latter and said reference pressure drop, and means for supplying a metered flow of air between said corresponding sides of said test element without passing therethrough until said pressure differential responsive means indicates that said test pressure drop substantially equals said reference pressure drop, whereby the amount of said metered flow of air indicates the air permeability of said test element relative to said reference element.

10. An apparatus for testing the air permeability of an element having an opening therein communicating the opposite sides thereof, said apparatus comprising means for subjecting one side of a reference element to atmospheric pressure and the other side thereof to a subatmospheric pressure to establish a reference flow of air and a reference pressure drop therethrough, pressure differential responsive means, means communicating said pressure differential responsive means with said atmospheric pressure and said subatmospheric pressure to indicate said reference pressure drop, said first named means being operable on the corresponding sides of a test element to establish a test flow of air and a test pressure drop therethrough, said pressure differential responsive means being operable to indicate the difference between said test pressure drop and said reference pressure drop, and means for supplying a metered flow of air under said atmospheric pressure on the one side of said test element to the other side thereof through the opening therein until said pressure differential responsive means indicates said test pressure drop to substantially equal said reference pressure drop, whereby the amount of the metered flow of air indicates the air permeability of said test element relative to said reference element.

11. An apparatus for testing the area of clogging of an annular axially extending air filter element having an axial opening therein communicating the axially opposite ends thereof, said apparatus comprising means for subjecting one side of a reference air filter element to atmospheric pressure and the other side thereof to a subatmospheric pressure to establish a reference flow of air and a reference pressure drop therethrough, pressure differential responsive means, means communicating said pressure differential responsive means with said atmospheric pressure and said subatmospheric pressure to indicate said reference pressure drop, said first named means being operable on the corresponding sides of a test air filter element to establish a test flow of air and a test pressure drop therethrough, said pressure differential responsive means being operable to indicate the difference between said test pressure drop and said reference pressure drop, and means for supplying a metered flow of air under said atmospheric pressure on the one side of said test air filter element to the other side thereof through the axial opening therein until said pressure differential responsive means indicates said test pressure drop to substantially equal said reference pressure drop, whereby the amount of the metered flow of air indicates the area of clogging of said test air filter element relative to said reference air filter element.

12. An apparatus as defined in claim 11 in which said means for generating a subatmospheric pressure within said housing comprises an exhaust conduit communicating the interior of said housing with atmospheric pressure exteriorly thereof, and adjustable air supply means including a supply conduit extending into and radially inwardly spaced from said exhaust conduit interiorly of said housing for supplying air under pressure and at a predetermined velocity to said exhaust conduit.

13. An apparatus for testing the air permeability of an element having an opening therein communicating the opposite sides thereof, said apparatus comprising a housing a housing including an element support having an opening therein communicating the interior of said housing with atmospheric air pressure exteriorly thereof, one side of an element being removably seatable in a test position on said element support with the opening in the latter communicating with the opening in said element, a test head removably seatable on the other side of an element in said test position and including an aperture therein communicating with the opening in said element, valve means adjustably controlling the area of opening of said aperture, means for generating a subatmospheric pressure within said housing whereby air will flow from the exterior of said housing to the interior thereof through an element mounted in said test position, pressure differential responsive indicating means, and means respectively communicating the pressures interiorly and exteriorly of said housing to said pressure differential responsive indicating means whereby the latter indicates the pressure differential interiorly and exteriorly of said housing, said valve means being adjustable to vary the area of opening of said aperture whereby air may flow directly under atmospheric pressure exteriorly of said housing through the opening in said element in said test position to the interior of said housing to augment the flow of air through said element to the interior of said housing to vary said pressure differential.

14. The apparatus as defined in claim 13 further comprising means for indicating the area of opening of said aperture.

15. An apparatus for indicating the areas of clogging of an annular axially extending air filter element having an axial opening therein communicating the axially opposite ends thereof, said apparatus comprising a housing including an element support having an opening therein communicating the interior of said housing with atmospheric air pressure exteriorly thereof, pressure differential responsive indicating means operable in response to the pressure differential interiorly and exteriorly of said housing, means respectively communicating the interior and exterior of said housing to said pressure differential responsive indicating means, means for generating a subatmospheric pressure within said housing whereby air will flow from exteriorly of said housing through the opening therein to the interior thereof, a test head including an aperture therein, valve means adjustably pivotally mounted on said test head for adjustably controlling the area of opening of said aperture, a filter element being removably mountable in a test position between said element support and said test head with said aperture, axial opening in said filter element and the opening in said element support being in direct communication with each other, means for generating a subatmospheric pressure within said housing whereby air will flow from the exterior of said housing through a filter element in said test position to the interior of said housing and said pressure differential responsive indicating means will indicate the pressure differential interiorly and exteriorly of said housing, said valve means being adjustable to vary the area of opening of said aperture to permit a variable amount of air to flow directly from the exterior of said housing through the opening of said aperture, the opening in said filter element and the opening in said element support to the interior of said housing to augment the flow of air through said filter element and vary said pressure differential, and cooperating means on said valve means and test head for indicating the area of opening of said aperture.

16. An apparatus for indicating the area of clogging of an annular axially extending air filter element having an axial opening therein communicating the axially opposite ends thereof, said apparatus comprising a housing including an element support having an opening therein communicating the interior of said housing with atmospheric air pressure exteriorly thereof, a pressure differential responsive member pivotally mounted within said housing, means communicating the opposite sides of said pressure differential responsive member respectively with air pressure interiorly of said housing and atmospheric air pressure exteriorly thereof whereby said pressure differential responsive member is pivotally movable in accordance with the air pressure differential interiorly and exteriorly of said housing, indicating means operatively connected to and responsive to pivotal movement of said air pressure differential responsive member to indicate said air pressure differential, means for generating a subatmospheric pressure within said housing whereby air will flow from exteriorly thereof through the opening therein, one end of a filter element being removably mountable in a test position on said element support with the opening therein communicating with the axial opening in said element, a plate removably seatable on the other end of said element in said test position and including an aperture therein communicating with the axial opening in said element, valve means adjustably pivotally mounted on said plate for adjustably controlling the area of opening of said aperture, and cooperating means on said plate and valve means indicating the area of opening of said aperture.

References Cited by the Examiner

UNITED STATES PATENTS

| 1,108,247 | 8/14 | Schenck | 230—92 |
| 2,000,741 | 5/35 | Buckland | 230—92 X |
| 2,350,058 | 5/44 | May | 73—38 |
| 2,355,858 | 8/44 | Hahn et al. | 73—38 |
| 2,390,252 | 12/45 | Hayward | 73—38 |
| 3,034,337 | 5/62 | Parmater | 73—38 |

FOREIGN PATENTS

| 619,002 | 4/61 | Canada. |
| 552,000 | 6/32 | Germany. |
| 191,677 | 9/37 | Switzerland. |

ISAAC LISANN, *Primary Examiner.*